United States Patent [19]

Burt

[11] Patent Number: 4,671,983

[45] Date of Patent: Jun. 9, 1987

[54] EMBOSSMENTS FOR MINIMIZING NESTING IN ROLL MATERIAL

[75] Inventor: John T. Burt, Irvington, N.Y.

[73] Assignee: Marcal Paper Mills, Inc., Elmwood Park, N.J.

[21] Appl. No.: 743,912

[22] Filed: Jun. 12, 1985

[51] Int. Cl.[4] .................... B32B 3/30

[52] U.S. Cl. .................... 428/179; 428/171; 428/906; 162/109; 162/113; 162/117

[58] Field of Search .................... 428/171, 179, 906; 162/117, 113, 109

[56] References Cited

U.S. PATENT DOCUMENTS

| | | | |
|---|---|---|---|
| Re. 27,453 | 8/1972 | Schutte et al. | 162/117 |
| 1,224,650 | 5/1917 | Kitchen | 162/117 |
| 2,177,490 | 10/1939 | Kieffer | 428/179 |
| 3,337,388 | 8/1967 | Wosaba, II | 161/63 |
| 3,414,459 | 12/1968 | Wells | 161/131 |
| 3,556,907 | 1/1971 | Nystrand | 156/470 |
| 3,672,950 | 6/1972 | Murphy et al. | 161/129 |
| 3,708,366 | 1/1973 | Donnelly | 156/209 |
| 3,728,905 | 6/1973 | Thomas | 161/127 |
| 3,867,225 | 2/1975 | Nystrand | 156/209 |
| 3,867,872 | 2/1975 | Nystrand | 93/1.1 |
| 3,905,863 | 9/1975 | Ayers | 162/117 |
| 3,940,529 | 2/1976 | Hepford et al. | 428/178 |
| 3,961,119 | 6/1976 | Thomas | 428/178 |
| 4,100,017 | 7/1978 | Flautt, Jr. | 162/111 |
| 4,181,068 | 1/1980 | Pollock | 93/1 A |
| 4,191,609 | 3/1980 | Trokhan | 162/113 |
| 4,307,141 | 12/1981 | Walbrun | 428/132 |
| 4,320,162 | 3/1982 | Schulz | 428/154 |
| 4,333,979 | 6/1982 | Sciaraffa et al. | 428/179 |
| 4,339,088 | 7/1982 | Niedermeyer | 242/1 |
| 4,483,728 | 11/1984 | Bauernfeind | 156/209 |

*Primary Examiner*—Roland E. Martin
*Assistant Examiner*—B. A. Bozzelli
*Attorney, Agent, or Firm*—Burns, Doane, Swecker & Mathis

[57] ABSTRACT

A repeating arrangement of embossments for roll material includes a first array of projections generally regularly spaced from one another and a second array of projections superimposed on the first array of projections with each projection of the second array extending longitudinally between two projections of the first array so as to minimize nesting of adjacent layers of material.

15 Claims, 23 Drawing Figures

Fig. 2a
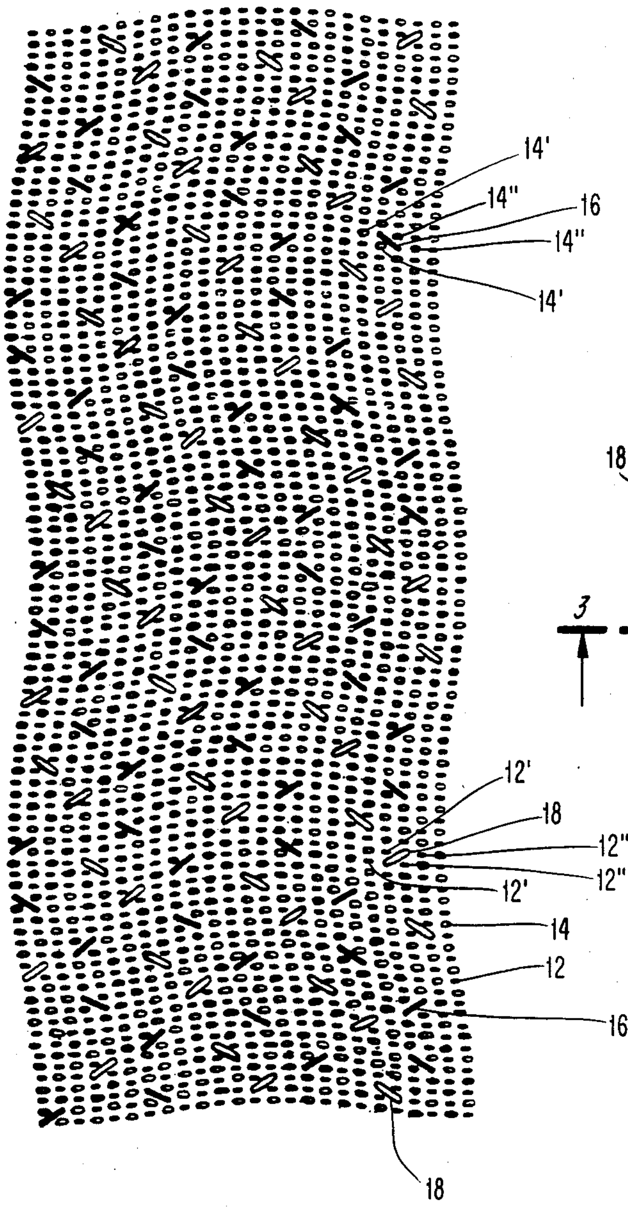
Fig. 2b
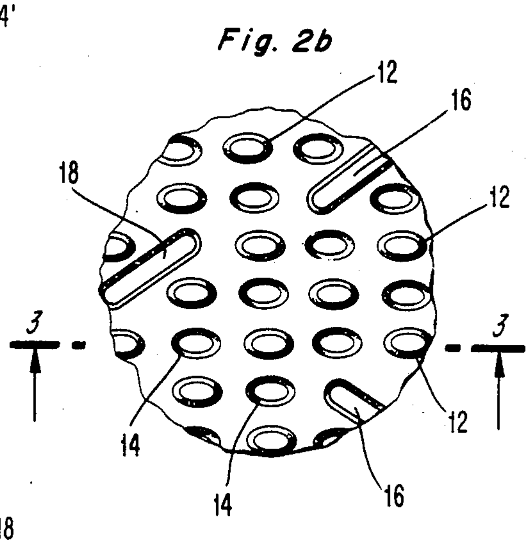
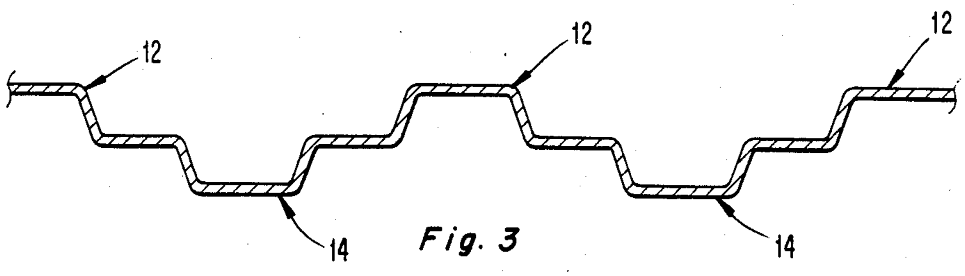
Fig. 3

EMBOSSMENTS FOR MINIMIZING NESTING IN ROLL MATERIAL

BACKGROUND AND SUMMARY OF THE PRESENT INVENTION

The present invention relates generally to a method and apparatus for embossing a roll of material and more particularly relates to a method and apparatus for avoiding nesting in roll material.

Roll material, especially paper products such as paper towels, is typically provided with a pattern of embossments which adds bulk and texture to the roll material. Moreover, the embossments also affect the diameter of the roll of material depending upon the extent to which the embossments of adjacent layers of material are "nested" in one another.

Partial nesting of the embossments of adjacent layers of roll material can have the undesirable effect of causing a collapse or flattening of the non-nested embossments. Moreover, partial or substantial nesting of the embossments of adjacent layers of material reduces the "bulkiness" of the roll of material and also reduces the resiliency to squeezing of the roll of material.

For all of these reasons, it is desirable to minimize or to completely eliminate the nesting of embossments of adjacent layers of roll material especially in paper products such as roll paper towels.

As discussed in the background portion of U.S. Pat. No. 4,339,088 of Niedermeyer which issued on July 13, 1982, nesting can be completely eliminated if the repeat length of the embossment pattern in the machine direction is at least equal to the circumference of the finished roll. Conversely, if one desired to have complete nesting throughout the wound roll of material, the sketch repeat would likely have to be as long as the total footage in the wound roll, for example, about 200 lineal feet. As a result, most wound material having symmetrical embossments (i.e. on both sides of the roll material) have regions of relatively high nesting and relatively low nesting throughout the roll of material.

In U.S. Pat. No. 4,181,068 of Pollock which issued on Jan. 1, 1980 another embossing pattern for paper towels is disclosed wherein the pattern is provided in order to maintain a desired structure and absorption characteristic in the paper towels. The embossment pattern includes an arrangement wherein the repeat pattern is symmetrically oriented about a center line so as to form a helix of about five degrees relative to the machine direction.

Other embossment patterns for single-ply towels are disclosed in U.S. Pat. No. 3,337,388 of Wosaba which issued on Aug. 22, 1967 and in U.S. Pat. No. Re. 27,453 of Schutte et al. which issued on Aug. 1, 1972.

A different approach to solving the problems associated with wound material especially paper towels, involves the use of laminated paper structures including at least two plys of material each having an embossment pattern. The individual plys are then joined together at various locations. Examples of such laminated paper structures are disclosed in the following U.S. Pat. Nos. 3,414,459; 3,556,907; 3,672,950; 3,708,366; 3,738,905; 3,867,225; 3,867,872; 3,940,529; 3,961,119; 4,100,017; 4,307,141; 4,320,162; and 4,483,728.

The embossment arrangements for such laminated paper towels cannot be applied to single ply tissue and moreover is not particularly applicable to lightweight two ply paper products because of the additional expense and difficulty resulting from the need to combine the different plys together after the embossments have been provided in the individual plys. Moreover, the use of adhesive to join the plys together may interfere with the embossment pattern of the individual plys.

Accordingly, it is an object of the present invention to provide a repeating arrangement of embossments for a roll of material which embossments are configured so as to minimize nesting of adjacent layers of material in the roll.

Another object of the present invention is to provide a repeating arrangement of embossments having a repeat length in the machine direction which is less than the circumference of the finished roll and whereby the nesting of adjacent layers of material is minimized or eliminated.

Still another object of the present invention is to provide a method and apparatus for maximizing the bulkiness and roll diameter of roll material while maintaining resiliency in the roll material especially in paper towels by minimizing nesting in the roll material.

Yet still another object of the present invention is to provide a method and apparatus for minimizing the collapse of embossments in wound material especially paper towels by reason of partial nesting of the embossments of adjacent layers.

These and other objects of the present invention will become apparent to one skilled in the art upon reading the detailed description of the present invention in conjunction with the accompanying drawings.

According to the present invention, a roll of material is provided with a repeating arrangement of embossments which are configured so as to minimize nesting of the adjacent layers of material with the arrangement of embossments including a first array of projections which are generally regularly spaced from one another and a second array of projections (i.e. the first and second arrays are superimposed on one another in the same arrangement of embossments) with each projection of the second array extending longitudinally between two projections of the first array.

Furthermore, according to the present invention, a roll of material is provided with a repeating arrangement of embossments that is configured so as to minimize nesting of adjacent layers of material with the arrangement of embossments comprising a first array of generally conical projections arranged generally in a sinusoidal manner with a second array of projections superimposed on the first array of projections with each projection of the second array being substantially larger than each of the projections of the first array.

BRIEF DESCRIPTION OF THE DRAWINGS

The preferred embodiments of the present invention are described in conjunction with the accompanying drawings wherein:

FIG. 2(*a*) is a representation of a preferred embodiment of a pattern of embossments according to the present invention;

FIG. 2(*b*) is an enlargement of a portion of the pattern of embossments of FIG. 2(*a*);

FIG. 3 is a view through the line 3—3 of FIG. 2(*b*);

DETAILED DESCRIPTION OF THE PREFERRED EMBODIMENTS

Figure 1:
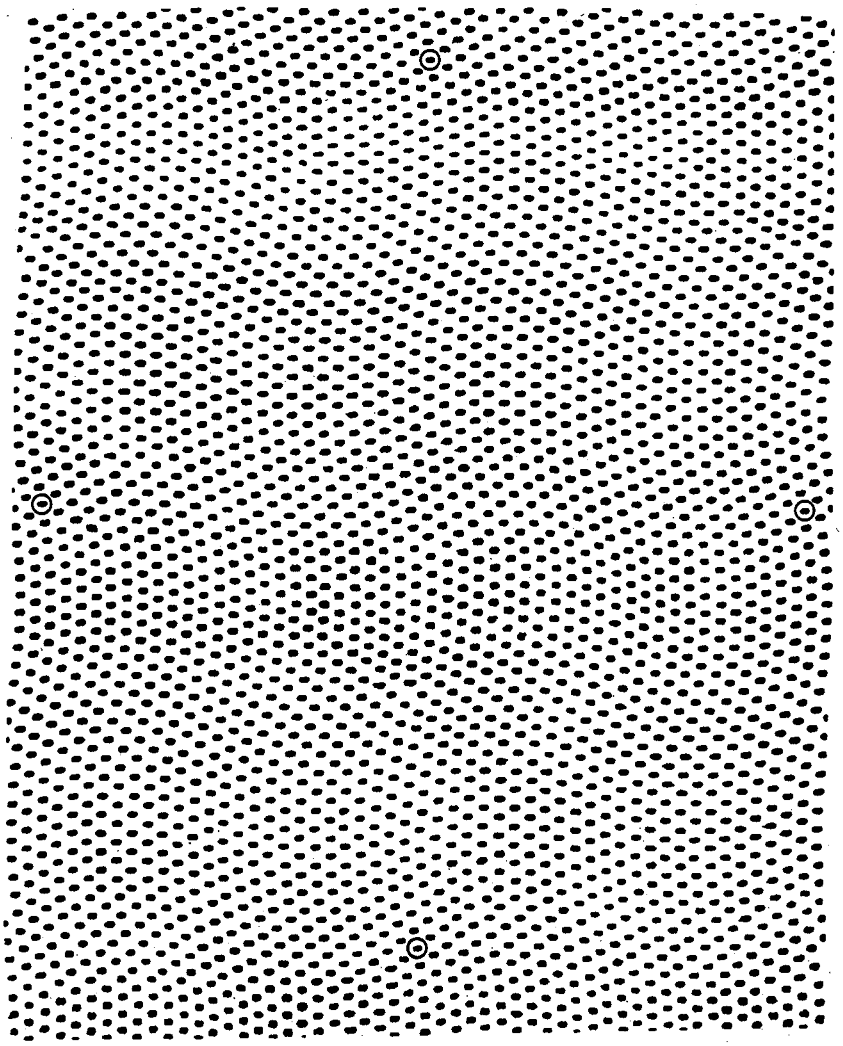
Fig. 1 (PRIOR ART)
FIG. 1 is a representation of a sinusoidal pattern of embossments according to the prior art.
Figure 4F:
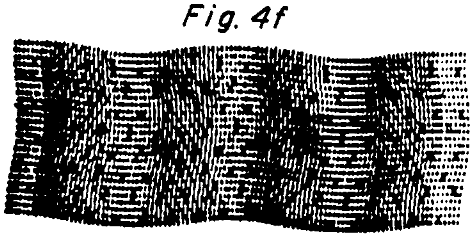
FIG. 4(*a*)-FIG. 4(*l*) are schematic illustrations of the nesting of adjacent sheets of roll material having a pattern of embossments as shown in FIG. 2(*a*)
Figure 4E:
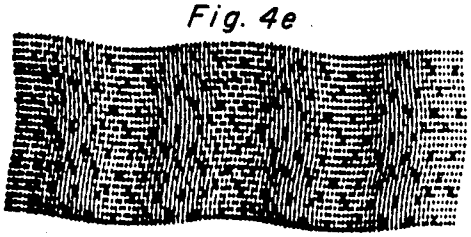
Figure 4D:
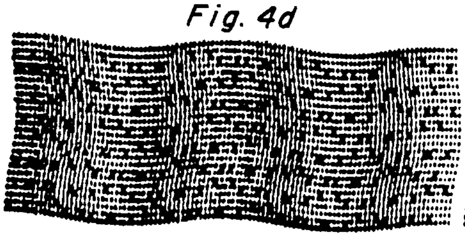
Figure 4C:
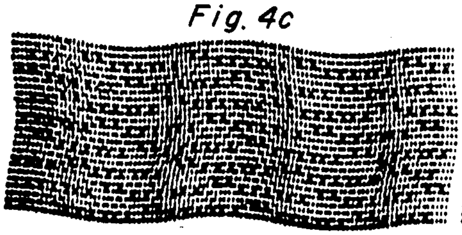
Figure 4B:
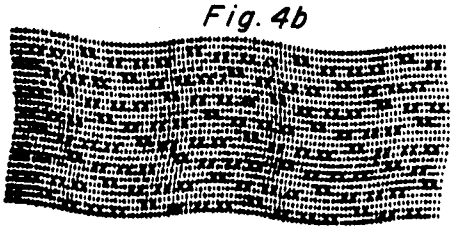
Figure 4A:
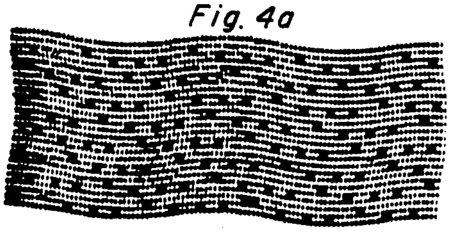
Figure 4G:
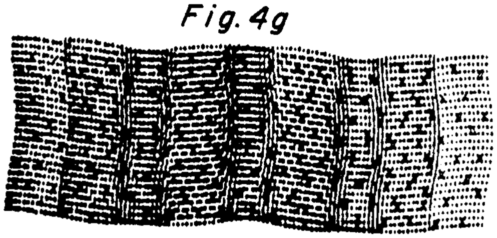
Figure 4H:
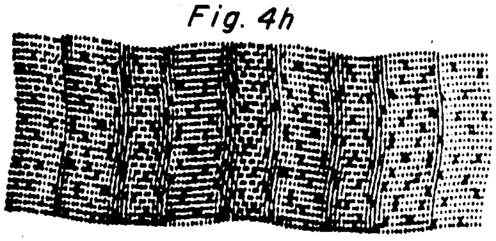
Figure 4I:
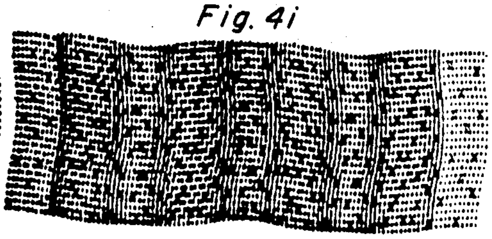
Figure 4J:
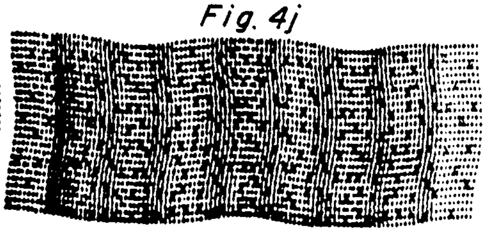
Figure 4K:
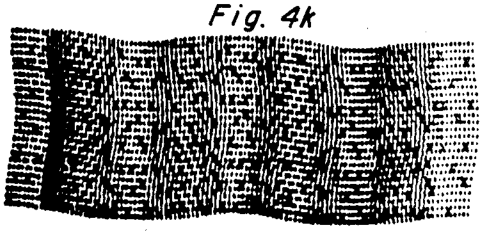
Figure 4L:
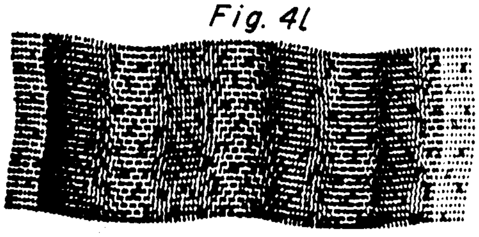

With reference now to FIG. 1, a pattern of embossments for use in roll material such as paper towels and the like according to the prior art is comprised of a sinusoidal arrangement of projections each having a tapered configuration and being generally oval in cross-section. In the embodiment of FIG. 1, all of the projections are oriented in the same direction (i.e., projecting upwardly from the plane of the figure) with the individual projections arranged in a sinusoidal manner.

In this particular array, the projections are arranged generally linearly in the horizontal direction (cross-direction) and in the sinusoidal manner in the vertical direction (machine direction). That is, along any given horizontal row of projections, the projections are arranged generally linearly or with a slight sinusoidal deviation from the linear. Moving along a row of projections in the vertical direction, however, the row follows a more noticeable sinusoidal path. Still further, the individual projections are aligned along diagonal lines which likewise have a slight sinusoidal deviation from the linear.

As discussed in the background portion of U.S. Pat. No. 4,339,088 of Niedermeyer which issued on July 13, 1982 and which patent is incorporated herein by reference, the sinusoidal array of projections results in a reduction in the extent of nesting of adjacent layers of material in a wound roll.

With reference now to FIG. 2(*a*), an embossment pattern for roll material according to the present invention includes a plurality of embossment patterns which are superimposed upon one another in the same embossment arrangement.

In the particular arrangement illustrated in FIG. 2(*a*), a first array of projections includes a generally sinusoidal array of oval projections. Adjacent projections in both the vertical and in the horizontal direction extend perpendicularly with respect to the plane of the embossment pattern in opposite directions with an upwardly directed projection 12 shown as a solid oval in the figure and with a downwardly directed projection 14 shown as a hollow oval in the figure. Each of the projections 12, 14 has a tapered configuration and is generally oval in cross-section.

In addition to this first arrangement of projections, a second arrangement of projections is provided in the embodiment of FIG. 2(*a*). This second arrangement of projections comprises a plurality of upwardly directed projections 16 each shown as a solid bar and a plurality of downwardly directed projections 18 each shown as a hollow bar in the figure.

This second array of projections 16, 18 is oriented generally along diagonal lines in the pattern with the individual projections of each diagonal line alternating from an upward orientation to a downward orientation (i.e. perpendicular with respect to the plane of the embossment pattern) and vice versa. These diagonal lines of projections or "bars" 16, 18 in the second array are oriented in a crisscross manner with respect to one another throughout the entire pattern in a regular arrangement.

With reference again to the individual bars 16, 18, each of these bars encompasses two individual projections 12, 14, of the first array of projections and is formed by extending the pair of projections 12, 14, of the first array completely between each other. Both of the individual projections 12, 14 encompassed by one of the bars 16, 18, however, would otherwise have projected in the same direction as the bar 16, 18.

For example, each projection 16 would include two projections 12 otherwise provided between the projections 14′ and 14″ in the first array.

Likewise, the bar 18 includes two projections 14 which would otherwise be found between the projections 12′ and 12″.

With reference now to FIG. 2(*b*), an enlarged portion of the embossment pattern of FIG. 2(*a*) is shown with the smooth contour of each of the individual projections 12, 14, and the individual bars 16, 18 readily apparent. The smooth and rounded configuration of each of these projections along with the generally conical shape of the projections facilitates the impression of the embossment pattern in roll material such as paper towels. This embossment pattern is accomplished by the use of matched rollers in a manner well known to those skilled in the art of paper towel making, especially single-ply and thin two-ply paper towels.

With reference to FIG. 3, a cross section of a roll material embossed with the array of FIG. 2(*a*) is shown with the smooth configuration of each of the projections 12, 14 again being apparent.

With reference now to FIG. 4, the possible nesting of adjacent layers of roll material having the embossment pattern of FIG. 2(*a*) is shown. With reference first to FIG. 4(*a*), the nesting of adjacent layers of material (provided with the embossment arrangement of FIG. 2(*a*)) is shown when the arrays are offset by only one horizontal row from each other. When the arrays are offset by other than an entire (integral) horizontal row, the projections 12, 14 cannot nest. Proceeding through FIGS. 4(*b*)–4(*l*), the adjacent embossment arrangements are progressively offset by 2, 3, 4, etc. horizontal rows. In this way, FIG. 4(*a*) corresponds to an offset of one row, FIG. 4(*b*) corresponds to an offset of two rows and so on until FIG. 4(*l*) which corresponds to an offset of the arrays of 12 horizontal lines.

With reference to FIG. 4(*c*), four relatively distinct horizontal bands can be discerned in the nesting pattern. These horizontal bands correspond to locations where the first arrays of sinusoidally distributed projections 12, 14 do not align with one another in the adjacent layers. Therefore, these four bands correspond to areas where the nesting of adjacent layers of material is relatively low or non-existent. Considering now the areas between the horizontal bands, the second array of projections 16, 18 (along with the alternating direction of orientation of the projections 12, 14) would prevent a nesting of the two layers of material as would otherwise be possible.

Thus, the second array of projections prevents nesting in the adjacent layers of material in the regions provided between the horizontal bands of nonalignment in the materials and the ability of two adjacent layers to nest in a wound roll of material is significantly reduced or eliminated as compared with the prior art arrangement of a sinusoidal array of projections.

Furthermore, the use of alternating upwardly and downwardly extending bars 16, 18 and projections 12, 14 in the embossment pattern of FIG. 2(*a*) further significantly reduces the possibility of nesting in row material having this embossment pattern.

With reference now to FIGS. 5-9, the first array of projections 12 comprises a sinusoidal arrangement of embossments substantially similar to that of FIG. 1. However, in each of the FIGS. 5-9, a second array of projections or bars is varied.

Figure 5:
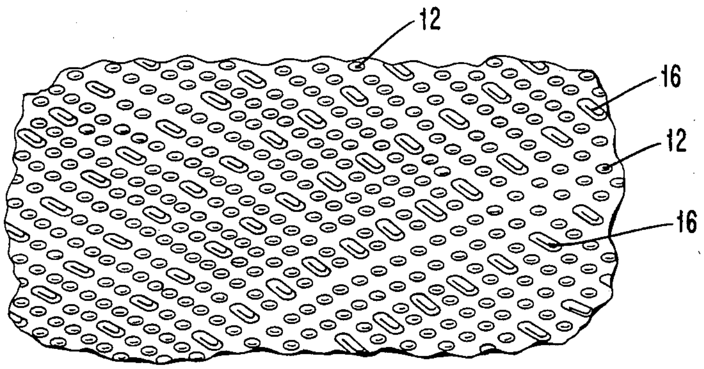
FIGS. 5–11 are illustrations of other embossment patterns according to the present invention.

Referring now to FIG. 5, another embodiment of the embossment pattern according to the present invention includes a second array of embossments or bars 16 each of which extends between two diagonally adjacent projections 12 of the array. All of the projections 12 and the bars 16 of the first and second arrays of FIG. 5 are oriented in the same direction (i.e. perpendicularly up or down with respect to the plane of the embossment pattern), with the bars 16 further being aligned with one another along generally diagonal directions. Specifically, in FIG. 5, the diagonal rows of bars 16 are spaced from one another by a diagonal row of projections 12. Along each diagonal row of bars 16, the adjacent bars 16 are separated from one another by two projections 12.

Figure 6:
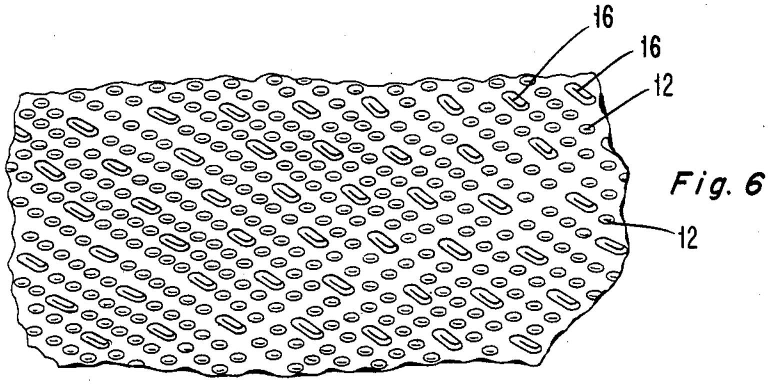

With reference now to FIG. 6, a somewhat similar arrangement of projections is shown. In the arrangement of FIG. 6, however, the bars 16 are arranged in generally diagonal rows but with six projections 12 provided between each sequential bar 16 within the diagonal rows. Bars 16 are provided in each of the diagonal rows of projections 12 of the array but the bars 16 are staggered from one another so that the bars of different diagonal rows are aligned in generally diagonal rows themselves.

Figure 7:
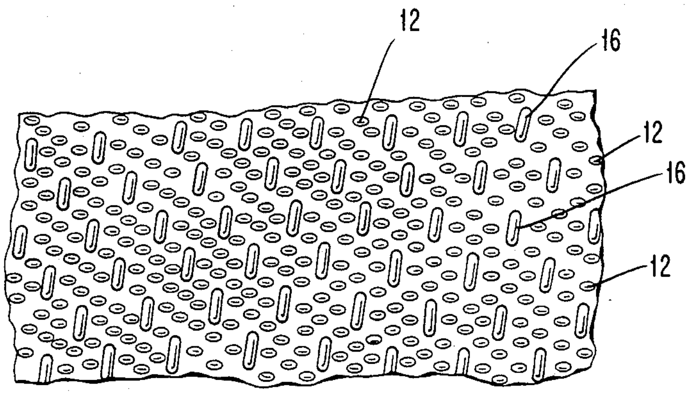

With reference now to FIG. 7, the second array of bars 16 is oriented vertically along the machine direction with the bars 16 provided in alternating vertical rows of projections 12. Within each vertical row of bars 16, adjacent bars 16 are spaced apart by two projections 12. Further, the bars 16 of the vertical rows are staggered with respect to one another so that the bars 16 are also provided along generally diagonal lines throughout the pattern.

Figure 8:
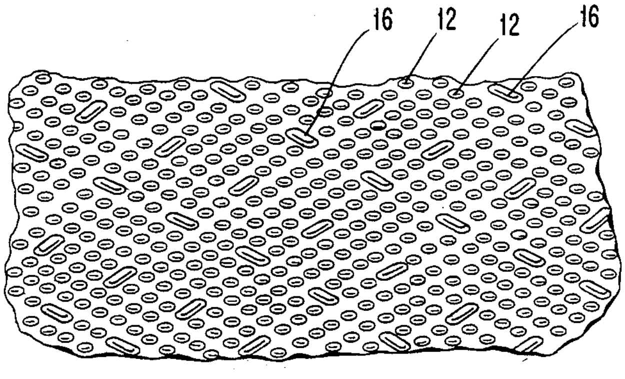

With reference now to FIG. 8, yet another arrangement of bars 16 in a second array is disclosed. In the arrangement of FIG. 8, the bars 16 are provided along generally diagonal rows of projections 12 with a first set of rows of bars 16 oriented in one diagonal direction and a second array of rows of bars 16 oriented in the other diagonal direction. The first set of diagonal rows of bars 16 are spaced apart from one another by seven diagonal rows of projections 12 with the individual bars 16 in each of the diagonal rows spaced apart from one another by two projections 12. The other set of diagonal rows of bars 16 are spaced apart from one another by three diagonal rows of projections 12 with adjacent bars 16 in each of these diagonal rows spaced apart from one another by six projections 12.

Figure 9:
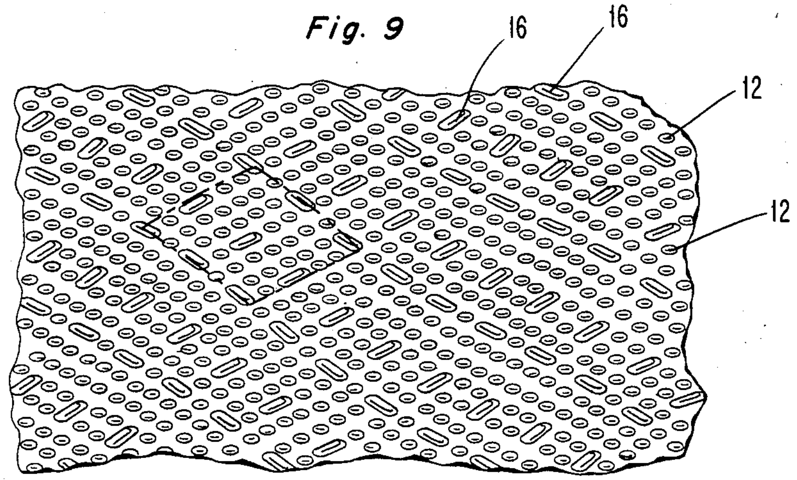

With reference to FIG. 9, a somewhat similar arrangement to that of FIG. 8 includes a first set of rows of diagonally oriented bars 16 which adjacent rows are spaced apart by five diagonal rows of projections 12 and with the spacing between adjacent bars 16 in each diagonal row of the first set being only one projection 12. The rows of the second set of diagonally oriented rows of bars 16 are separated from one another by two diagonal rows of projections 12.

Figure 10:
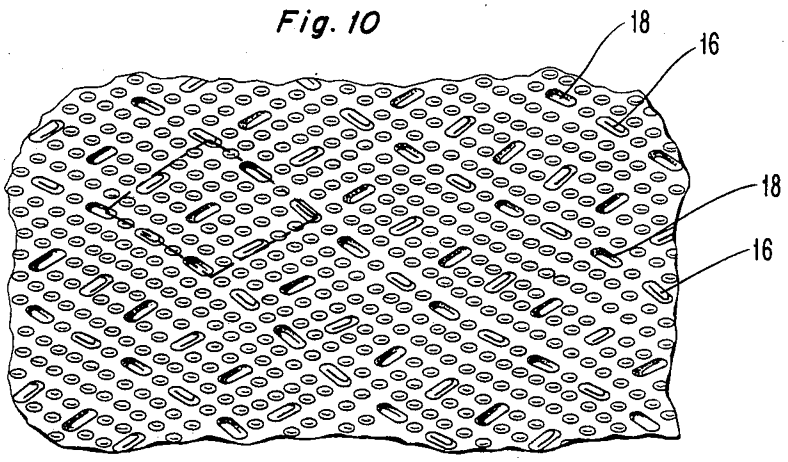

With reference now to FIG. 10, still a different pattern of arrangements of embossments according to the present invention is disclosed which is similar to that of FIG. 9 with the exception that the bars 16, 18 in each of the diagonal rows of the first and second arrays alternate between an upwardly directed configuration and a downwardly directed configuration.

Figure 11:
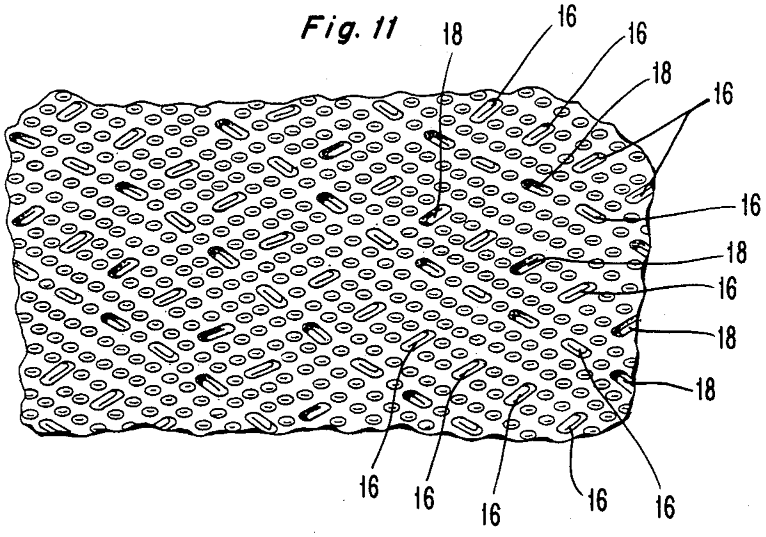

With reference to FIG. 11, a pattern which is somewhat similar to FIG. 10 is disclosed in that the spacing between adjacent diagonal rows of bars 16, 18 is the same. However, the frequency of change in direction for the bars 16, 18 is varied in FIG. 11. Along the first set of diagonal rows of bars, the bars 16 alternate between a raised configuration and a lowered configuration. In the other direction, however, the diagonal rows of bars 16, 18 include first rows which are all oriented in the same raised configuration and adjacent rows having alternating bars 16, 18 which vary between a raised and lowered configuration.

By use of the present invention, the degree of nesting of adjacent layers of row material is substantially reduced or eliminated as compared with the prior arrangement of a sinusoidal array of projections all oriented in the same direction. Moreover, the arrangement of the present invention accomplishes the significant reduction or elimination in nesting without the use of an embossment pattern having a repeat length as long or longer than the circumference of the finished roll. In this way, the embossment pattern of the present invention is relatively easy and economical to accomplish.

Moreover, the use of an embossment pattern having a repeat sketch length which is as long or longer than the roll circumference in the machine direction is frequently undesirable in terms of product aesthetics and may also significantly affect the product performance and the life of the matched steel embossing rolls.

A symmetrical (i.e. embossment provided on both sides of the roll material) embossed pattern which achieves a maximum product wound caliper while both maintaining an adequate ply bonding and maintaining a high level of product aesthetics and performance factors has been achieved by a preferred embodiment of the embossment pattern of the present invention.

In particular, the base pattern (FIG. 1) is not excessively busy while providing a somewhat multi-directional stretch relationship. The regular array of projections facilitates stretch in a large number of directions (i.e., 0°, 45°, 135°, 180°, 225°, and 315°) which in turn provides for an improved perception of strength with respect to the actual total strength in the roll material.

The base pattern (FIG. 1) alone, however, would result in an unacceptable degree of nesting in the pattern.

Roll material having the embossment pattern of FIG. 2(*a*), according to the present invention, has resulted in a caliper efficiency improvement of up to about 11% (from a previous efficiency of about 66-68% to an improved efficiency of about 76%). Moreover, the wound caliper (which is calculated as the average sheet caliper of a finished product roll and indicates the bulking ability of an embossing pattern) was about 0.0285 inches in that roll as compared with the highest wound caliper of non-symmetrical (i.e. embossed on only one side) patterns of about 0.0240 inches and other symmetrical patterns having wound calipers of 0.0160 inches, 0.0210 inches and 0.0225 inches. The wound caliper is equal to the area of the roll (end view) minus the area of the core (end view) divided by the linear length of the roll.

In summary, according to the present invention, a method for embossing a roll of material is provided having a repeating arrangement of embossments which are configured so as to minimize the nesting of adjacent layers of material. The web material is embossed with a pair of co-mating embossing rollers having a first array of projections which are generally regularly spaced from one another and a second array of projections with each projection of the second array extending longitudinally between two projections of the first array. Preferably, the first array of projections is arranged in a sinusoidal manner with each of the projections of the first array being generally conical.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A roll of material having a repeating arrangement of embossments, said arrangement of embossments comprising:

means for minimizing nesting of adjacent layers of said material, said means comprising:

a first array of projections generally regularly spaced from one another and arranged in a sinusoidal manner, said first array of projections being provided in all of the plies of the material and being symmetrically arranged on both sides of the material; and a second array of projections superimposed on said first array of projections with each projectionof said second array extending longitudinally between two projections of said first array and encompassing said two projections of said first array, the projections of said second array being provided in all of the plies of the material and having a height which is substantially the same as the height of the projections of the first array.

2. The roll of material of claim 1 wherein each of said projections of said first array is generally conical in cross-section.

3. The roll of material of claim 1 wherein adjacent projections of said first array extend perpendicularly in opposite directions with diagonally aligned projections of said first array extending perpendicularly in the same direction and with each of said projections of said second array extending between two diagonally aligned projections of said first array.

4. The roll of material of claim 1 wherein adjacent projections of said first array extend perpendicularly in opposite directions.

5. The roll of material of claim 2 wherein adjacent projections of said first array extend perpendicularly in opposite directions with diagonally aligned projections of said first array extending perpendicularly in the same direction and with each of said projections of said second array extending between two diagonally aligned projections of said first array.

6. The roll of material of claim 3 wherein the pattern of said second array is substantially similar to that of FIG. 5.

7. The roll of material of claim 3 wherein the pattern of said second array is substantially similar to that of FIG. 6.

8. The roll of material of claim 3 wherein the pattern of said second array is substantially similar to that of FIG. 7.

9. The roll of material of claim 3 wherein the pattern of said second array is substantially similar to that of FIG. 8.

10. The roll of material of claim 3 wherein the pattern of said second array is substantially similar to that of FIG. 9.

11. The roll of material of claim 3 wherein the pattern of said first and second arrays is substantially similar to that of FIG. 10.

12. The roll of material of claim 3 wherein the pattern of said first and second arrays is substantially similar to that of FIG. 11.

13. The roll of material of claim 3 wherein the pattern of said first and second arrays is substantially similar to that of FIG. 2(*a*).

14. A roll of material having a repeating arrangement of embossments, said arrangement of embossments comprising:

means for minimizing nesting of adjacent layers of said material, said means comprising:

a first array of generally conical projections arranged generally in a sinusoidal manner, said first array of projections being provided in all of the plies of the material and being symmetrically arranged on both sides of the material; and a second array of projections superimposed on said first array of projections with each projection of said second array being substantially larger than each of the projections of said first array, the projections of said second array being provided in all of the plies of the material and having a height which is substantially the same as the height of the projections of the first array.

15. The roll of material of claim 14 wherein adjacent projections of said first array extend perpendicularly in opposite directions.

* * * * *